(12) United States Patent
Cousaert et al.

(10) Patent No.: US 10,006,760 B2
(45) Date of Patent: Jun. 26, 2018

(54) MODULAR PASSIVE REFRIGERATION CONTAINER

(71) Applicant: ETABLISSEMENTEN FRANZ COLRUYT, Halle (BE)

(72) Inventors: Erik Cousaert, Halle (BE); Caren Noels, Halle (BE); Koen Merckx, Halle (BE); Wim Vanverre, Halle (BE); Joachim Van Mulders, Halle (BE)

(73) Assignee: ETABLISSEMENTEN FRANZ COLRUYT, Halle (BE)

( * ) Notice: Subject to any disclaimer, the term of this patent is extended or adjusted under 35 U.S.C. 154(b) by 86 days.

(21) Appl. No.: 14/394,044

(22) PCT Filed: Apr. 15, 2013

(86) PCT No.: PCT/IB2013/052986
§ 371 (c)(1),
(2) Date: Oct. 10, 2014

(87) PCT Pub. No.: WO2013/153545
PCT Pub. Date: Oct. 17, 2013

(65) Prior Publication Data
US 2015/0107292 A1    Apr. 23, 2015

(30) Foreign Application Priority Data
Apr. 13, 2012  (BE) .................... 2012/0250

(51) Int. Cl.
*F25D 19/00*  (2006.01)
*G01B 11/14*  (2006.01)
(Continued)

(52) U.S. Cl.
CPC ............... *G01B 11/14* (2013.01); *F25D 3/06* (2013.01); *F25D 11/003* (2013.01);
(Continued)

(58) Field of Classification Search
CPC ......... A47B 31/02; F25D 3/06; F25D 11/003; F25D 2303/08; F25D 2303/081;
(Continued)

(56) References Cited

U.S. PATENT DOCUMENTS 2,591,168 A    4/1952   Latham, Jr. et al.
5,669,233 A    9/1997   Cook et al.
(Continued)

FOREIGN PATENT DOCUMENTS

DE    19755468 A1 *  6/1999
EP    1186841 A2     9/1998
(Continued)

OTHER PUBLICATIONS

Translation of DE 19755468.*
International Search Report (PCT/ISA/210) for PCT/IB2013/052986 dated Jul. 17, 2013.

*Primary Examiner* — Elizabeth Martin
(74) *Attorney, Agent, or Firm* — Koppel, Patrick, Heybl & Philpott

(57) ABSTRACT

The invention relates to a modular passive refrigeration container for the cold storage and transport of goods, especially fresh produce and deep-frozen goods as well as to a method for the assembly of such a modular passive refrigerated container, comprising at least: (i) a cooling element, suitable for binary ice as coolant, comprising at least three plate-shaped hollow cooling segments, wherein the plate-shaped cooling segments define at least a portion of the refrigeration space, (ii) an insulation material in plate form, and (iii) a housing, suitable for receiving said cooling element and said insulating material in plate form, wherein said cooling element is removably surrounded by said housing, and wherein a space between the said cooling element and said housing is at least partially filled with said
(Continued)

insulating material which is reversibly connected with either said housing or said cooling element or both.

21 Claims, 3 Drawing Sheets

(51) Int. Cl.
    *F25D 3/06*         (2006.01)
    *F25D 11/00*       (2006.01)
    *F25D 23/00*       (2006.01)
    *G01B 9/02*        (2006.01)

(52) U.S. Cl.
    CPC ......... *F25D 23/006* (2013.01); *G01B 9/0207* (2013.01); *F25C 2301/002* (2013.01); *F25D 2201/126* (2013.01); *F25D 2201/14* (2013.01); *F25D 2303/081* (2013.01); *F25D 2303/082* (2013.01); *F25D 2303/08222* (2013.01); *F25D 2331/804* (2013.01); *Y10T 29/49359* (2015.01)

(58) Field of Classification Search
    CPC ......... F25D 2303/084; F25D 2331/804; F25D 2400/38; F25D 17/02
    See application file for complete search history.

(56) References Cited

U.S. PATENT DOCUMENTS

| | | | |
|---|---|---|---|
| 6,367,268 B1* | 4/2002 | Paul | B60H 1/3235 |
| | | | 62/330 |
| 2002/0088244 A1 | 7/2002 | Jennings et al. | |
| 2010/0170287 A1 | 7/2010 | Boss | |
| 2011/0277489 A1* | 11/2011 | Schalla | A47B 31/02 |
| | | | 62/89 |

FOREIGN PATENT DOCUMENTS

| | | |
|---|---|---|
| EP | 2374443 A1 | 10/2011 |
| JP | 04-031283 | 2/1992 |

* cited by examiner

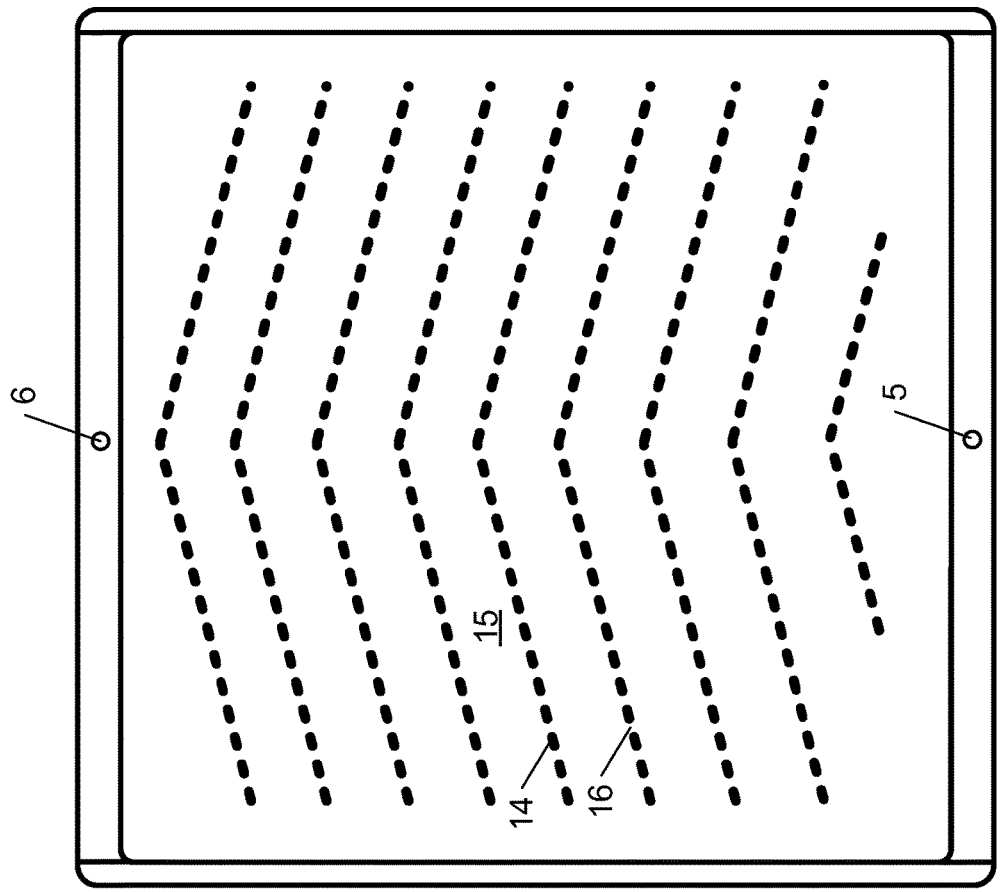
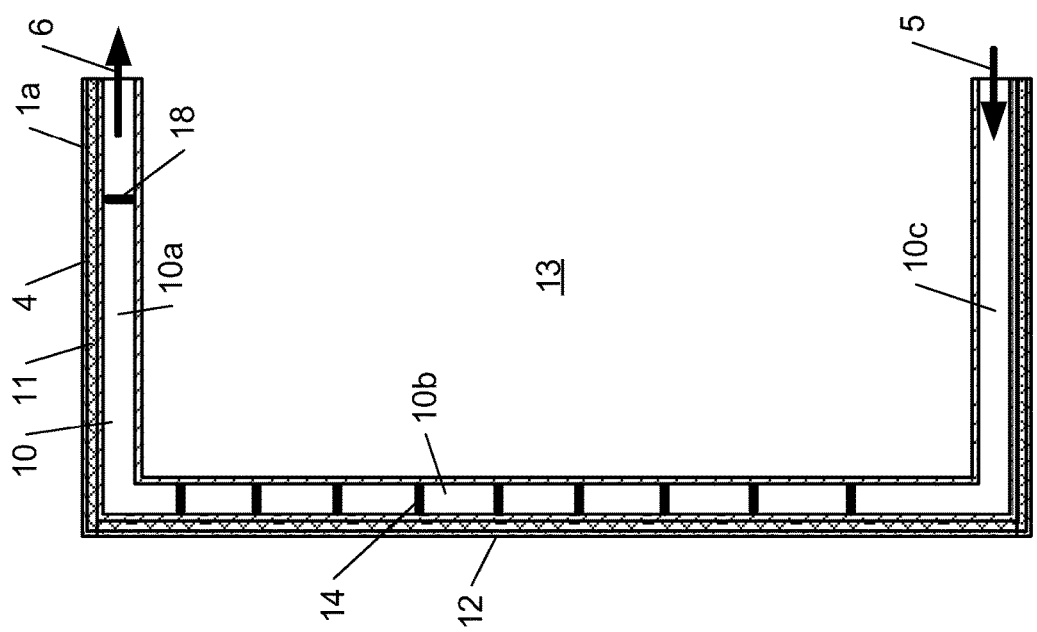

MODULAR PASSIVE REFRIGERATION CONTAINER

INTRODUCTION

The invention relates to a modular passive refrigeration container for the refrigerated storage and transport of goods, in particular fresh and deep frozen products, as well as to a method for the assembly of such modular passive refrigeration container.

BACKGROUND OF THE INVENTION

Refrigerated transport is required to maintain a cold chain for fresh produce such as flowers, vegetables, fruits, milk products, meat, fish and poultry, frozen foods such as ice cream and other temperature sensitive products such as chemicals, biological agents, explosives, etc. which have to be at least partly refrigeratedly transported. The refrigerated transport includes transport by light and heavy trucks, trains, containers, ships, aircraft, etc.

Distribution networks typically make use of such a refrigerated transport. Refrigerated goods are stocked in refrigerated refrigeration containers, conveyed to the shops and unloaded into the refrigerated space of the respective stores. This allows a cold chain to be guaranteed for 100%.

There are basically two types of refrigeration containers, namely active and passive refrigeration containers. In active refrigeration containers, the cooling is substantially carried out during the transport by a compressor, in which a cooling agent is circulated in the pipes of a cooler and evaporated, and the ambient air or a gas, for example nitrogen in a controlled atmosphere, is cooled.

Heat is withdrawn from a cooling (cold) area, whereby the circulating ambient air or the gas is getting colder. Optionally there is a circulation system present in, or associated with, the refrigeration container, for example, a fan, to advance the circulation of the ambient air, and thus the cooling rate. Such cooling systems have the disadvantage that they are dependent on a source of energy, in particular an electrical power source, optionally in combination with a diesel engine. As a result, active refrigeration containers are essentially immobile, expensive and maintenance prone. The advantage is that active refrigeration containers are not dependent on an extremely good insulation since the compressor can continue working until the desired cooling temperature is reached.

Passive refrigeration containers comprise a cooling system whereby no external power source is present during transport for taking care of the refrigeration. Thus, it is not possible to pump around or to evaporate a coolant. In a first embodiment, this may be active refrigeration containers which were disconnected from their power source. In another embodiment, these are refrigeration containers in which the cooling is carried out by a coolant which is present in the refrigeration container, and which allows for the cooling due to its physical properties, for example, by the sorption of zeolites or by a phase transition (solid/liquid/gas). Typical examples of the refrigeration on the basis of a phase transition, are refrigeration by ice, in particular binary or slurry-ice, for example, water-based, water/ethylene glycol mixtures, water/alcohol mixtures, or water/salt mixtures (eutectic mixtures); refrigeration by solid $CO_2$ ($CO_2$ snow, carbonic ice, dry ice), liquid $CO_2$, acetone and liquid nitrogen. The coolant may be present in a separate container in the refrigeration container, or may be located in the wall, for example, in hollow channels, divided over the wall, into a hollow space in the wall, or in a double-walled cooling segment which forms the wall, or a part of it.

Such passive refrigeration containers are able to hold their desired cooling temperature only for a limited time which is why they must be provided with a very good insulation. Typically, such an insulation is provided in the form of polyurethane foam, which at the same time has a reinforcing function. In the production of such a refrigeration container, the polyurethane foam is sprayed in the space between the cooling element and the housing, so that, after the foaming and curing of the polyurethane foam, a solid insulating layer is obtained which bonds the housing to the cooling element, and grants the necessary strength.

The inventors have found that already under normal use, for example in distribution centers which intensively use large amounts of said passive refrigeration containers, passive refrigeration containers often need to be repaired. It particularly concerns repairs to the housing and the moving parts, in particular to the door of the refrigeration container. By the use of intensive large numbers of said passive refrigeration containers at the distribution center and by treatment thereof with manipulation devices such as forklift trucks, both the outer wall (the housing) as the inner wall are often crushed, with the result that the intermediate insulation is compressed and partially loses its insulating power. These repairs are labor intensive, and the quality of the repaired refrigeration container is never equivalent to that of an original because the two walls, which are usually glued together with PUR, must be drawn from each other, whereby the insulation is damaged, the dent in the insulation must be sprayed again and then everything should be reassembled. Such passive refrigeration containers from the prior art are in fact made not to be disassembled, or only occasionally, after assembly of the different parts, in particular the cooling element, the insulation and the housing. Often such containers with a severe defect are decommissioned instead of carrying out a difficult repair. In addition, the components, in particular the insulation and the housing, are not or hardly available as a separate part in order to be exchanged against the installed components.

STATE OF THE ART

EP 1 186 841 A2 (Integral Energietechnik GmbH) discloses a passive refrigeration container with at least one wall comprising at least one hollow wall segment whereby binary ice is used as a coolant. The hollow wall segment includes distributions to prevent the rising of the ice of the binary ice. In order to evacuate the excess air, a system of channels in the partitions is proposed (FIG. 10).

US 2010/0170287 A1 (Blanco CS GmbH) discloses a refrigeration container with one or more hollow vertical walls which are divided into a large number of wall segments, which are divided from each other by means of wall dividers which extend horizontally in the wall and form recesses within it. Shelves fit in the recesses, which extend between two vertical walls and on which food, such as plates, can be placed. In this way a wall is obtained which, filled with binary ice, has a uniform distribution of cold and which transmits this cold to the shelves. The refrigeration container shown does not seem insulated and is preferably adapted to be used in the distribution of food, prepared in centralized kitchens and large hospitals.

JP 4031283 (JP 7014747 B) discloses a truck, implemented as an insulated passive refrigeration container in which the walls (side walls, top wall and bottom wall) are connected to each other and together form a continuous hollow space, optionally divided into interstices, and filled with ice-slurry. The truck shown is not modular.

DESCRIPTION OF THE INVENTION

The inventors have now designed a modular passive refrigeration container which overcomes the disadvantages of the prior art. The modular passive refrigeration container according to the invention comprises at least:

(i) a cooling element, suitable for binary ice as coolant, comprising at least one plate-shaped hollow cooling segment, wherein the plate-shaped cooling segment defines at least a portion of the refrigeration space, (ii) any insulating material in plate shape, and (iii) a housing, adapted to receive, said cooling element and mentioned insulating material in plate shape, wherein said cooling element is removably surrounded by said housing, and wherein a space between said cooling element and said housing is at least partially filled with said insulating material which is reversibly connected with either said housing, or said cooling element, or both.

The refrigeration container according to the invention meets one or more of the following conditions:

the maintenance of the cold chain for a long period of time, such as for example at least 48 hours, for example, depending on the ambient temperature, so that the stored goods may be refrigerated over the weekend at the required temperature, wherein the required temperature in the cooling compartment lies between +0.5 and +4° C. for fresh produce applications, and is lower than −18° C. for deepfreeze applications.

the cooling of the refrigeration container within a shorter period of time, such as for example, not more than 30 minutes, independently from the starting temperature of the refrigeration container, typically from a starting temperature equal to the ambient temperature, preferably from 25° C., more preferably from 20° C. until the desired final temperature, typically between +0.5 and +4° for fresh produce applications, and lower than −18° C. for deepfreeze applications.

to obtain a homogeneous temperature in the refrigeration compartment of the refrigeration container, for example, being a temperature which differs, for example, no more than a few degrees, for example no more than 2 degrees, or for example, even no more than 1 degree within the whole volume of a loaded refrigeration container) without mechanical ventilation.

A further advantage is that the refrigeration container is designed to combine a maximum cooling volume with a minimal outer volume, i.e. for a given outer volume (which is among others given by the dimensions of the vehicles which transport the refrigeration containers), the inner volume of the refrigeration container is maximized in order to store, cool and transport as many products as possible.

A further advantage is that no liquid or solid $CO_2$ must used as in many refrigeration containers of the prior art, which decreases the ecological footprint of such a refrigeration container, and contributes less to an increase in the $CO_2$ content in the air. In addition, the binary ice, or the fluid which remains after the melting of it, is collected and substantially re-used to produce new binary ice, which may be implemented in a simple and inexpensive manner in a commercially available apparatus. This means that the cooling of the refrigeration containers with binary ice is cheaper than with the use of liquid or solid $CO_2$, and that a strategic independence of the supplier of liquid or solid $CO_2$ can be ensured. For example, for fresh produce applications binary ice is 30 times less expensive than solid $CO_2$ (at an ice temperature of −4° C.) and for deep freeze applications (at an ice temperature of −34° C.) binary ice is 10 times less expensive than solid $CO_2$.

The special feature of this refrigeration container is that it is made up of components, particularly a cooling element, insulation material, and housing which is also quickly and easily disassembled. This makes it easy to replace the defective parts or doing repairs to the defective parts after they were removed from the refrigeration container, in particular to the cooling element, the insulation material and the housing. Moreover, the choice and implementation of the components is such that few repairs need to be performed.

Cooling Element

The cooling element is suitable for binary ice as a coolant and comprises at least one plate-shaped hollow cooling segment, wherein the plate-shaped hollow cooling segment defines at least a portion of the refrigeration space. The plate-shaped hollow cooling segment thus forms at least a portion of the inner wall of the refrigeration container. In order to increase the cooling capacity, the cooling element contains more preferably at least two, or even at least three plate-shaped hollow cooling segments, wherein the plate-shaped hollow cooling segments define at least a portion of the refrigeration space and thus define at least a portion of the inner wall of the refrigeration container.

Preferably, the cooling element comprises at least one connector, preferably at least two connectors, for providing binary ice in the hollow cooling segments. To that end, for instance, each hollow cooling segment is provided with at least one filling opening and a vent, suitable for filling with binary ice.

If several cooling segments are present, for example, at least two or at least three, the plate-shaped cooling segments are each separately integrated into the refrigeration container, or, preferably, they may be connected to each other, for example, at their edges, and thus together form one hollow cavity. Preferably, the refrigeration container comprises at least three plate-shaped hollow cooling segments which are connected to each other, preferably at their edges, preferably over the entire length of their edges, so that substantially a single hollow double-walled space is formed, wherein the cooling segments taken together define the refrigeration space. This has the advantage that only a single filling opening and only a single vent needs to be provided in the cooling element.

The cooling element is at least suitable for binary ice as a refrigerant. However, other cooling means may also be used with the cooling element according to the invention, for example, a micro-eutectic material (for example, micro-eutectic spheres) blended with a liquid with a freezing point depression agent.

According to a first embodiment, three plate-shaped hollow cooling segments form a C-shaped cooling element, in which two plate-shaped cooling segments are arranged parallel to each other and connected by a third which extends perpendicularly between the plate-shaped cooling segments placed parallel to each other.

According to an alternative embodiment, the third plate-shaped cooling segment, which extends perpendicularly between the plate-shaped cooling segments placed parallel to each other, is divided into two separate hollow spaces which are not in fluid communication with each other. In an embodiment, in which the third plate-shaped cooling segment together with the first and second cooling segment forms a hollow space, a C-shaped cooling element arises with two L-shaped hollow compartments, each of which should be filled separately with coolant, in particular binary ice. In a preferred embodiment, this third cooling segment is a cooling segment, which is placed vertically in the refrigerated container, which is transversely divided into two areas that do not communicate with each other. Preferably, the volume of the upper compartment is substantially equal to the volume of the lower compartment, but in principle any relative volume distribution may be chosen. This embodiment has several advantages. By splitting up the cooling capacity of the cooling segment, for example in 2×50% of the cooling power, a refining of the cooling power may be obtained, for example, by not filling the lower compartment or filling it with a chilled liquid for refrigeration, and the upper compartment with binary ice. This allows that other (equilibrium) temperatures are obtained in the refrigerated container by reduction and/or change of the cooling surface. A further advantage is that the upper compartment (the upper L-shaped compartment) may be more easily fractioned because the omission of the liquid created by the difference in height allows for a better separation between the liquid and the ice. Further, the pressure in each compartment is reduced by the formation of a lower static liquid height. Each compartment shall be provided with at least one filling opening and a vent. In one embodiment, the filling openings and vents are located near each other, respectively, at the bottom and the top of the refrigerated container. In this case, the filling opening for the upper L-compartment, which is located at the bottom of the refrigerated container, is to be connected to the upper L-compartment via a filler pipe or duct, and the vent for the lower L-compartment, which is located at the top of the refrigerated container, is to be connected to the lower L-compartment via a tube or duct. The respective filling tubes, pipes or channels may be integrated in the cooling segment or, if present, in the adjacent cooling segments. The principle of the division of a hollow plate-shaped cooling segment into two or more hollow spaces may be readily applied by the skilled person to each hollow plate-shaped cooling segment in the cooling element according to the invention, depending on the intended purpose or advantage.

According to a second embodiment, three plate-shaped hollow cooling segments form a cooling element, wherein each of the three plate-shaped hollow cooling segments are connected to each other on two sides with the edge of this side, or, in other words, with the three plate-shaped hollow cooling segments each perpendicular to each other.

According to a further embodiment, the cooling element comprises at least one further plate-shaped cooling segment which is connected to one or more of the edges with the at least three hollow plate-shaped cooling segments.

According to one embodiment, the further plate-shaped element is a hollow plate-shaped cooling segment which is connected with one or more of its edges with the other present hollow plate-shaped cooling segments together forming one hollow space. As a result, a cooling element is obtained which comprises four plate-shaped hollow cooling segments. According to one embodiment, said four hollow plate-shaped cooling segments form a □-shaped cooling element whereby in each case two hollow plate-shaped cooling segments are disposed in parallel to each other and the pairs are disposed perpendicular to each other and are connected to each other at their edges so that substantially a single hollow space is formed, and wherein the cooling segments together define the refrigeration space.

According to an alternative embodiment, four hollow plate-shaped cooling segments form a seat-shaped cooling element in which two hollow-plate-shaped cooling segments are disposed in parallel to each other, and in which two hollow plate-shaped cooling segments extend between these two hollow plate-shaped cooling segments which are mutually perpendicular and also perpendicular to the two parallel hollow plate-shaped cooling segments, and are connected with each other at their edges so that substantially a single hollow space is formed, and in which the segments together define the refrigeration space.

According to one embodiment, five hollow plate-shaped cooling segments form an open box-shaped cooling element in which four hollow plate-shaped cooling segments, each being connected on three sides with their edges to each other, and a fifth hollow plate-shaped cooling segment is attached to four sides, with its said edge with each of the four hollow plate-shaped cooling segments so that substantially a single space is formed, and in which the segments together define the refrigeration space.

According to one embodiment, the further plate-shaped element is a full plate-shaped cooling segment that is connected to one or more edges, or is in thermal contact, with the other present plate-shaped cooling segments. Preferably the refrigeration container comprises at least two full-plate cooling segments. By "full" is meant here a plate-shaped element which comprises at least no binary ice as coolant, more in particular which comprises no hollow spaces which are provided for a coolant.

According to a preferred embodiment of the invention, the refrigeration container comprises said C-shaped cooling element and three full plate-shaped cooling segments, wherein one plate-shaped cooling segment is only partially occluding the refrigerated space, wherein an opening is left for access to the refrigeration space in the refrigeration container. This opening is preferably closed off by a door element, that is to say an element which is pivotally, slidably or deployably panel-connected to the rest of the refrigeration container and which may be pivoted away or moved away to provide access to the inside of the container for placing goods in it or from it.

The full plate shaped cooling segments are preferably in thermal contact with the hollow plate-shaped cooling segments to transfer the cold of the hollow plate-shaped cooling segments (in refrigerated condition) to the full-plate cooling segments, and further all other parts of the refrigerated container. The cooling then takes place by thermal conduction through the walls and the air in the refrigeration container is cooled by natural air convection and/or radiation along the cold interior surfaces of the refrigeration space, also referred to as cargo space, enclosed by said plate-shaped cooling segments.

According to a preferred embodiment, the inner sides of the plate-shaped cooling segments which together define the refrigeration space, also form the inside of the refrigeration container. Goods may therefore be placed directly on or against the inner sides of the plate-shaped cooling segments or be stacked. According to an embodiment, the inner side is also provided with elements for the goods to be secured, such as braces, grips, eyes, slits and the like, optionally in one piece with the plate-shaped cooling segments, in the present case, the cooling element. According to another embodiment, the inner surface is further provided with protruding elements (ribs, ridges, and the like) in order to increase the cooling surface of the inner side optionally cast in one piece with the plate-shaped cooling segments, in this case the cooling element The hollow plate-shaped cooling segments together form a hollow double-walled space. This space is suitable for being filled with binary ice, also known as slurry-ice, as a coolant. Suitability for use of binary ice is an essential part of the invention. The invention thus relates to a refrigeration container in which the cooling element is at least partially filled with binary ice.

Binary ice is an aqueous suspension of very small (typically 0.1 to 1 mm in diameter) ice crystals in a mixture of water and, optionally, a freezing point depressing component, for example, salt (sodium chloride), ethylene glycol, propylene glycol, various alcohols (iso-butanol, ethanol), and sugar (sucrose, glucose). Binary ice has a greater heat absorption capacity compared with e.g. a saline solution because the enthalpy of fusion (latent heat) of the ice is also used. Binary ice can have a temperature of from 0 to $-X°$ C., where X is determined by the eutectic point of the binary ice solution. By the use of binary ice of about 0° C. for fresh applications (+0.5° C. to +4° C.) the freezing products which are in immediate or short contact with a cooling element is prevented, in contrast to for example, the use of $CO_2$ snow which has a temperature of $-78°$ C., and wherein the radiation causes products in the vicinity of the $CO_2$-container in the refrigerator space to freeze. Binary ice has the advantage that no freeze damage occurs to the products to be frozen when used. Binary ice is formed from an aqueous solution or a mixture in special evaporators through the cooling of a surface and the scraping off of the formed ice crystals thereof, or is obtained from a direct contact heat exchanger, in which an aqueous solution or a mixture of ice crystals are formed in the liquid at the triple point of the liquid (water: 0.01° C. at approximately 0.006 atmosphere). Binary ice contains between 1 and 99% of ice crystals. Binary ice is a liquid, pumpable fluid and an excellent coolant. Concentrations up to 35% ice crystals can be pumped with standard pumps and through standard pipes and hoses on a quasi-unlimited distance. Higher concentrations require more powerful and special pumps and pipes and the distance is limited to about 100 m. The invention thus makes use of the unique properties of binary ice for cooling of the refrigerated container in order to meet the above conditions.

The hollow plate-shaped cooling segment or the hollow plate-shaped cooling segments, if present, or the entire hollow space, may be provided with binary ice with the help of a filling station. A typical filling station comprises one or more devices which produce binary ice, optionally also the storage containers for binary ice, and storage containers for the liquid from which the binary ice is made. Binary ice may be made with different temperatures for different cooling applications, for example flowers (+6° C.), dairy products (+1° C.), fresh fish (−1° C.), frozen meat or ice cream (−18° C.) by choosing the ice temperature (related to the proportion of ice in the binary ice and freezing point-depressing components).

The binary ice can be provided in the hollow cooling segment or hollow cooling segments via connectors in the cooling element. Preferably, the cooling element comprises two connectors, wherein more preferably a first connector is located near the bottom of the cooling element, and a second connector is located near the top of the cooling element. In one embodiment, the C-shaped cooling element comprises a first connector at the front and at the bottom in the first cooling segment of the two parallel cooling segments, and a second connector at the front and at the top in the second cooling segment of the two parallel cooling segments. The binary ice is pumped into the first cooling segment in the hollow space through the first lower connector (the filling opening), wherein the second upper connector in the second cooling segment serves as the air vent of the cooling element (vent), and wherein the binary ice fills cooling element from the bottom to the top, i.e., from the lower cooling segment, via the vertical cooling segment to the upper cooling segment.

According to embodiments, the at least one connector, more preferably the at least two connectors, are arranged on the outside of the refrigerated container so that the cooling element can be filled without having to open the refrigerated container, or even to disassemble it.

Preferably, the at least one connector, more preferably the at least two connectors, are arranged on the inside of the refrigerated container so that any thermal bridge and/or condensation to the connector(s) may be avoided. In this method, the cooling element may be filled without having to disassemble the refrigerated container.

According to a particular filling method, the binary ice is fractioned in the hollow space of the cooling element by filling the cooling element with binary ice until the cooling element is completely filled, to subsequently drain the liquid, either through the same filling opening, optionally provided with a filter to separate the ice from the liquid or through a separate connector (discharge opening) permanently provided with a filter, so that the filling with binary ice and the discharge of the liquid may occur simultaneously, and the same amount by weight or may subsequently be substituted by the same amount by weight of binary ice.

Other embodiments of the cooling element may have, of course, connectors or several connectors, provided at other locations in the cooling element, which may easily be determined by the skilled person. The filling openings and/or vents may be provided, for example, under the door of refrigerated container, or behind the door of the refrigerated container. This latter embodiment has the advantage that the cooling and ventilation openings, which comprise valves or other connection means, are protected against damage during handling/transport of the refrigeration container.

In order to prevent the second connector, the vent, preferably located in the upper cooling segment of a C-shaped cooling element, from getting clogged with heaping ice from the moment that the binary ice begins to fill the upper cooling segment, the upper cooling segment comprising the air vent, in a preferred embodiment is preferably provided with an air- and liquid-permeable, but ice-withholding compartment, for example a perforated fin, which forms a separation between the air vent and the remainder of the upper cooling segment. This prevents the ice from clogging the vent. A clogged vent creates a pressure increase during the filling of the cooling element with binary ice so that the tank may be damaged and/or there is a risk that the cooling element is not completely filled.

The hollow cooling segment, the hollow cooling segments which together form the hollow portion of the cooling element, if any, and the full cooling segments, may be made of any material known in the art. Preferably, a material is chosen which confers the necessary stiffness to the cooling element as the cooling element has to be manipulated as a separate component and which conducts the cold. In one embodiment, the hollow cooling segments are made of a metal, for example stainless steel, or a plastic, for example selected from the group consisting of polyethylene, polypropylene, ABS, and nylon.

Plastic has the advantage that the hollow cooling segment, and in particular the cooling element, may be manufactured as a single piece, for example by casting or injection molding and that plastic is weldable.

More preferably, the material is polyethylene. Polyethylene has the advantage that the material is chemically resistant, food-grade, that it may be used in a temperature range suitable for cold temperatures, that is it tough, has a high wear resistance and is weldable.

The thickness of a plastic wall of a hollow cooling segment may be determined by the person skilled in the art and is preferably between 2 and 6 mm, more preferably 4 mm.

The thickness of a plastic wall of a full cooling segment may be determined by the person skilled in the art and is preferably between 2 and 10 mm, more preferably 6 mm.

Stainless steel has the advantage that a thinner wall may be provided and/or that a better heat conduction is achieved and/or that the wall may withstand a higher pressure and/or that the specific heat of stainless steel is relatively low and, for example, in general, lower than plastic. The thickness of a stainless steel wall of a hollow or filled cooling segment may be determined by the person skilled in the art and is preferably between 0.8 and 1.5 mm, more preferably between 0.8 mm and 1 mm.

In an embodiment, a plate-shaped hollow cooling segment is provided with a structure which ensures that the binary ice is homogeneously distributed in the entire plate-shaped hollow cooling segment, and—with a vertically disposed hollow cooling segment—prevents that the ice ascends in the vertically arranged hollow cooling segment. Also, this structure allows for the strength of the tank and for the stabilization of the binary ice during the transport of the cooling container (preventing the movement of the liquid in the cooling segment).

For this purpose, a plate-shaped cooling segment comprises preferably, if the cooling segment filled with binary ice is mounted substantially lying down or even horizontally, for example, one or more partitions for dividing the plate-shaped cooling segment into different compartments.

For this purpose, a plate-shaped cooling segment preferably comprises, if the cooling segment filled with binary ice is mounted substantially upright or even vertically, a structure in the hollow space of the plate-shaped cooling segment comprising essentially of one or more inverted V-shaped distributions (fins) which define mutually interconnected interstices, and which are provided with at least one through-opening, preferably a plurality of openings, preferably small opening (s), on the one hand to prevent the ascension of the ice and on the other hand to avoid gas, in particular air, to be allowed from an interstice, bounded by two inverted V-shaped partitions, to an upper interstice. Although the opening, preferably a plurality of openings, for example, may be provided in the form of at least one opening through the fins, the opening may also be provided in the form of one or more interruptions in the connection, for example a weld seam, of the fin with the wall of the plate-shaped cooling segment, it was found that providing an interrupted connection is usually easier than the providing openings through the fin.

In one embodiment, the one or more inverted V-shaped partitions are applied over almost the entire width of the plate-shaped cooling section, wherein the vertex of each inverted V-shaped partition, is found approximately in the middle of the plate-shaped cooling segment, and the two arms of each inverted V-shaped partition extend into the vicinity of the edge of the plate-shaped cooling segment.

In one embodiment, multiple inverted V-shaped partitions are applied over substantially the entire height of the plate-shaped cooling segment, in which the vertices of each inverted V-shaped partition are located approximately one above the other in the middle of the plate-shaped cooling segment.

In one embodiment, in particular in the vertical cooling segment of the C-shaped cooling element, at both ends of the inverted V-shaped partitions a free passage is provided. This free passage is important to almost pressure-less (only static height) fill the cooling segment homogeneously. The free passages also ensure that the cooling segment can be levelingly filled (such as a liquid). This combination of inverted V-shaped partitions that hold the ice and the free passage provide the desired effect, i.e. stabilizing the binary ice and a pressure-less filling of the cooling segment and thus the cooling element. In a preferred embodiment, the extremities of the inverted V-shaped partitions are located 60 mm from the edge of a cooling segment (the free passage is thus 60 mm on each side). In a preferred embodiment, a first end of an inverted V-shaped partition is located at the same height as the top of a second inverted V-shaped partition, which is below the first inverted V-shaped partition and which together define an interstice between them.

Preferably, the V-shaped partitions are located on the upper side of the cooling segment, for example, the upper V-shaped partitions, relatively closer to the edge of the cooling segment, for example 40 mm from the edge of the cooling segment, than the underlying V-shaped partitions, where it was found that such an arrangement causes a more homogeneous distribution of the binary ice in the cooling segment. Without wishing to be bound to any theory, it is in such a configuration, that the binary ice is directed more away from the edge of the cooling segment so that also the more central region of the cooling segment is provided with binary ice.

Such inventive distribution is not shown in EP 1186841 A2. In order to let the excess air escape during the filling of a plate-shaped cooling segment, typically along the bottom of a vertically placed plate-shaped cooling segment, the inventors have found that the said partitions comprise one or more small openings, in particular in the point of the inverted V, in order to allow the air to escape during the filling from an interstice, bounded by two partitions, to a higher-lying interstice.

The dimensions of the openings are such that air can easily escape, but that the mass of ice is retained. Preferably, these openings have a diameter of between 3 and 6 mm.

Insulating Material

The insulation material is located on the outside of the plate-shaped cooling segment, or if present, the plate-shaped cooling segments, in particular, the entire cooling element, so that the outside of the cooling element, in particular the double-walled plate-shaped cooling segments are covered with insulation material.

The insulation material should be in plate form and is reversible connected either to the cooling element, c.q. the cooling segments or with the housing, or with both. As the duration of the desired cooling time is also determined by the quality of the insulation, a good insulation is of particular importance.

A particularly preferred material is a vacuum insulation panel (VIP—vacuum insulation panel). A VIP is a form of thermal insulation which consists of a nearly gas-tight enclosure which encloses a high-porous hard core, from which the air was extracted. As a hard core, micro silica, airgel or glass fiber is used to support the covering, typically a polymeric material, against the atmospheric pressure when the panel is placed under vacuum (typically about 1 mbar absolute).

VIPs have a much better thermal properties than conventional materials. Commercially available VIPs have a thermal conductivity ($\lambda$) value of 0.004 W/(mK) over the thickness of the panel, or an average λ-value of 0.006 to 0.008 W/(mK) after the affixing, and when thermal bridging has occurred and inevitably vacuum loss has occurred after a certain time. In comparison: a material such as polyurethane, for example, a rigid polyurethane plate or sprayed polyurethane, which is conventionally used in a refrigeration container of the prior art, has a thermal conductivity of 0.024 W/(mK). As a result, a 4-fold better insulation value is obtained for the same thickness than in conventional refrigeration containers. Preferably, a VIP-plate thickness of between 15 and 60 mm, more preferably 30 mm is used.

A second particularly advantageous material is an airgel insulation plate. An airgel consists of a network of tiny structures with open pores, which form the vast majority, for example 95%, of the volume. It is made of silica according to a so-called sol-gel process. Due to its light structure, an airgel insulation plate consists for the most part of air which functions as an insulator. Commercially available airgel insulation plates (e.g. from Rockwool) have a thermal conductivity (A-value) of 0.013 W/(mK). Hereby, a 2 times better insulation value is obtained for the same thickness than conventional refrigerated containers. The advantage of an airgel insulation plate relative to a VIP is that the former is less prone to damage. Preferably, an airgel plate thickness of between 15 and 60 mm, more preferably 30 mm is used.

Both types of insulation plates may be used in a single refrigeration container.

A single insulation plate may have the dimensions of a cooling segment, or multiple plates may be used to insulate the cooling segment.

Housing

The housing is suitable to receive the cooling element and the insulating material In one embodiment, the housing is formed by six plate-shaped parts which together define the space which encloses the cooling element and the insulation. Preferably, six plate-shaped parts define a substantially rectangular space which encloses the cooling element and the insulation.

The housing is typically made of a metal, preferably stainless steel, or a plastic, for example ABS/PMMA, but any material may be used that is known to those skilled in the art. Such material must hand ensure the structural strength of the refrigerated container, and on the other hand protect the vulnerable insulation, such as during handling of the refrigerated containers. Both stainless steel and ABS/PMMA are well thermoformable, tough, shock-resistant, scratch resistant, shiny and UV resistant.

To provide access to the interior of the refrigeration container, the housing is provided with at least one opening in the housing which can be closed off, in particular, an opening that extends from substantially the bottom of the refrigeration container to substantially the top of the refrigeration container. The opening is preferably sealed with a plate-shaped cooling segment (in this case a door) which is a movable, particularly pivotable or slidable or deployable panel, more in particular pivotably, to the housing and/or cooling element of the refrigeration container, and thus forms part of it. The movable plate-shaped cooling segment is designed such that it joined in a thermally and uninterrupted air-tight (damp-proof) manner to the rest of the refrigeration container.

To this end, the movable plate-shaped cooling segment is provided with insulation and seals, preferably several seals such as double or even triple seals. As insulating material the insulating materials mentioned above may be chosen. In a particular embodiment, the inside of the movable plate-shaped cooling segment is made of ABS. ABS is good thermoformable and suitable for nutrition.

The movable plate-shaped cooling segment is further preferably equipped with one or more means such as door handles, levers, latches, physical locks, and the like, in order to be able to move the movable plate-shaped cooling segment, and thus to be able to access the refrigeration container, and optionally to lock it, for example as a security against theft. These means are mounted in such a way in the movable plate-shaped cooling segment that the insulation will not be interrupted and that cold/heat bridges are avoided.

The housing, including the door, may optionally be provided on the outside with means to reduce the warming-up, such as a reflective surface. This is important when the refrigeration containers must be for a longer time in the open air in the sun The refrigeration container is typically also provided at the bottom with wheels in order to move the refrigeration container. Alternatively, the refrigeration container may be placed on a moving platform, for example, a cart or another easy to manipulate platform, such as a pallet.

The invention also relates to the use of the modular passive refrigeration container according to the invention for the cold storage and transport of goods, especially fresh produce and deep frozen products.

Method for the Assembly of a Refrigeration Container

The refrigeration container is a modular refrigeration container and may thus be assembled and disassembled without damaging the individual parts, in particular the insulating material. According to a preferred embodiment, the method for the assembly of a refrigeration container comprises the steps of:

(i) providing a cooling element;

(ii) placement of the cooling element in a box-shaped housing which comprises at least 4 sides, until the cooling element is completely enclosed by the box-shaped housing; wherein a space between said cooling elements and said housing is at least partially filled with said insulating material and (iii) further sealing of the box-shaped housing with further housing parts.

According to preferred embodiments of the method, the cooling element may be covered with insulating material in plate form and the cooling element may be covered with insulating material in plate form placed in the box-shaped housing until the cooling element is covered with insulating material in plate-form, fully enclosed by the box-shaped housing.

According to alternative preferred embodiments of the method, the box-shaped housing is covered on the inside with insulating material in plate form and the cooling element is placed in the box-shaped housing, covered with insulating material in plate form until the cooling element is completely enclosed by the housing covered with insulating material in plate form.

According to a first embodiment, the method of assembling of a refrigeration container in other words, comprises the steps of:

(i) providing a cooling element which may be covered with insulating material in plate form;

(ii) placement of the cooling element, covered with insulating material in plate form in a box-shaped housing which comprises at least 4 sides, until the cooling element, covered with insulating material in plate form is totally enclosed by the box-shaped housing, and (iii) further sealing of the box-shaped housing with further housing parts.

According to a second embodiment, the method for the assembly of a refrigeration container comprises the steps of:

(ia) including a box-shaped housing which comprises at least 4 sides and covered on the inside with insulating material in plate form;

(iia) positioning the cooling element in said box-shaped housing, until the cooling element is totally enclosed by the housing, and (iii) further sealing of the box-shaped housing with further housing parts.

According to one embodiment, the method for further sealing of the housing with further housing parts comprises the fitting of a rear side and the fitting of a front side which is provided with at least one opening which may be reversibly closed, preferably with a plate-shaped cooling segment.

Preferably, the insulating material in plate form for example, is interconnected with the necessary rubber seals, or with tape, in order to form a vapor-tight whole between on the one hand the insulation plates and the cooling element on the other. The seals create a vapor diffusion resistance and prevent condensation between the insulation and the cooling element.

DESCRIPTION OF THE FIGURES

FIG. 3 shows a cross-section of the refrigeration container of FIG. 1.

FIG. 4 shows an embodiment of a rear cooling element according to the invention.

The following reference numbers are used in the text and the figures:

| | |
|---|---|
| 1 | Refrigeration container |
| 1a-f | Panels |
| 2 | Door |
| 3 | Rubber sealing |
| 4 | Screws |
| 5 | Filling opening |
| 6 | Vent |
| 7 | Undercarriage |
| 8 | Wheel |
| 9 | Frame |
| 10 | Cooling element |
| 10a-c | Hollow plate-shaped cooling segment |
| 11 | Insulation layer |
| 12 | Housing |
| 13 | Cooling space |
| 14 | V-shaped partition (fin) |
| 15 | Interstice |
| 16 | Openings |
| 17 | Free passages |
| 18 | Perforated fin |

DETAILED DESCRIPTION OF THE INVENTION

The refrigeration container according to the invention will now be further illustrated by way of example and with reference to certain embodiments and to certain figures, without being restricted thereto. The same reference numbers refer to the attached drawings for the same parts.

In the following description and the claims are left- and right-hand references determined by standing before the front of the refrigeration container and looking in the direction of the back side of the refrigeration container, i.e., against the inside of the back of an open refrigeration container. Also in the following description and claims, it should be understood that terms such as "front", "back", "bottom", "top", "inside", "outside-side", "left", "right", "up", "below", "inside", "outside", etc. as used throughout this description, be determined with reference to the normal operating mode of the refrigerated container and in its normal orientation, unless otherwise stated. The terms mentioned above should not be understood be as limiting terms.

Figure 1:
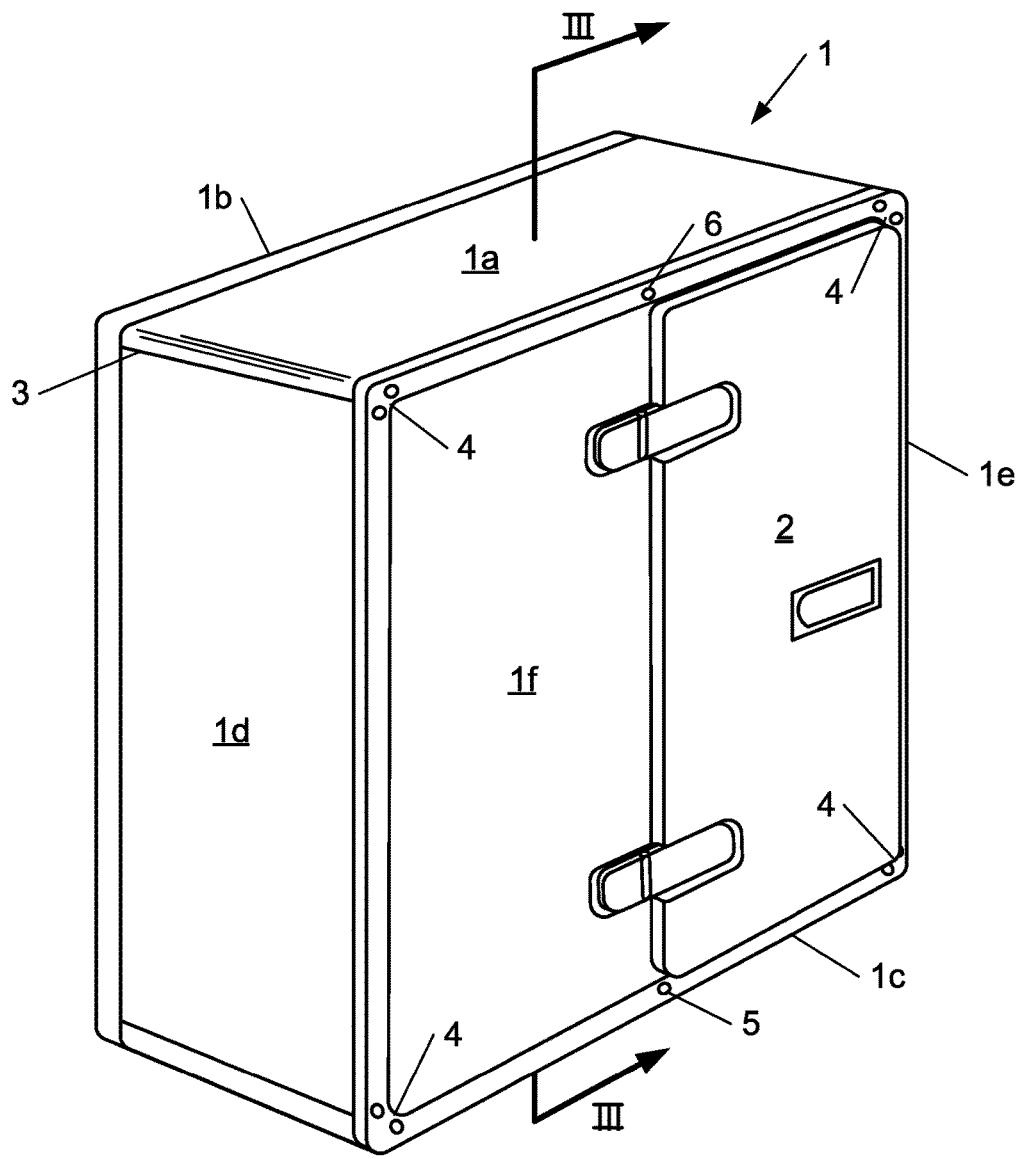
FIG. 1 shows an embodiment of the refrigeration container according to the invention.
Figure 2:
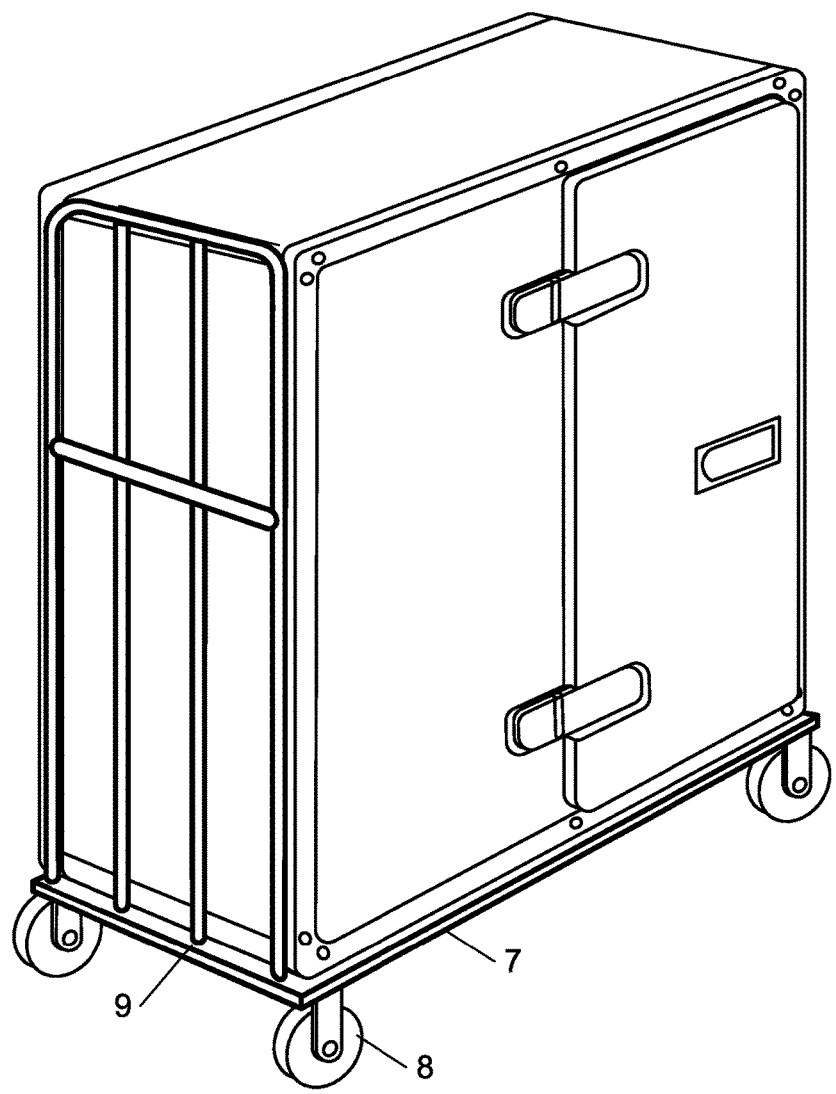
FIG. 2 shows a C-shaped cooling element according to the invention.

FIGS. 1 and 2 show a refrigeration container 1 according to the present invention. The refrigeration container is in the form of a six-sided rectangular box of about 2.2 meters high, about 1.2 meters wide and about 0.6 meters deep. The cooling container comprises three hollow cooling elements for the respective top, rear and bottom (FIG. 3, 10a, 10b, 10c), which are interconnected and which together form a hollow C-shaped cooling element, and three full cooling elements which, respectively, form the sides and the front. The housing of the refrigeration container is formed by respectively panels 1a (top), 1b (back), 1c (bottom), 1d (left) and 1e (right), and a half-open panel 1f (front), each panel being connected to a further panel, possibly via a rubber seal 3. The half-open panel 1f comprises an opening which is closed by a hinged door 2. The panels on the front and back 1b, 1f are detachably attached, for example, through screws 4. The panels together constitute the housing of the refrigeration container. In the front there is at the bottom a filling opening 5 and a vent 6. In one embodiment (FIG. 2), the refrigeration container may be provided with a chassis 7 with wheels 8 to be able to easily move the refrigeration container, and/or with a frame 9 in order to be able to handle the refrigeration container and to protect it against collisions.

FIG. 3 shows a cross-section through the refrigeration container (front side is not shown). The refrigeration container is composed of a C-shaped cooling element 10, an insulating layer 11, comprising a plate-shaped insulation and housing 12. The cooling element 10 comprises three hollow plate-shaped cooling segments 10a, 10b, 10c, which are connected to each other at their edges so that substantially a single hollow double-walled space is formed with a C-shaped cross-section transverse to the cooling element, and wherein the three hollow double-walled cooling segments together define the refrigeration space 13. The two right and left sides of the C-shaped cooling element are sealed with a full plate-shaped cooling segment that is in thermal contact with the hollow double-walled cooling element. Also, the front side may be—partially—closed off with a full plate-shaped cooling segment, in particular a half-open panel 1f comprising an opening which is closed by a hinged door 2. In this way, the refrigeration container is provided on three sides (1a, 1b, 1c) with walls which are cooled by binary ice and on three sides (1d, 1e, 1f) by walls which be cooled by thermal conduction. The lower cooling segment 10c is provided with a first connector at the front 5, for the filling of the cooling element with binary ice, and a second connector 6 at the front in the upper cooling section 10a for venting the air from the cooling element.

Figure 6:
FIG. 6 shows an embodiment of a perforated fin according to the invention.

FIG. 3 further shows a perforated fin 18 in order to prevent the vent 6, located in the upper cooling segment 10a of the C-shaped cooling element, from getting clogged with heaping ice from the moment that the binary ice begins to fill the upper cooling segment. A surface of such a perforated fin 18 is shown in FIG. 6.

Figure 5:
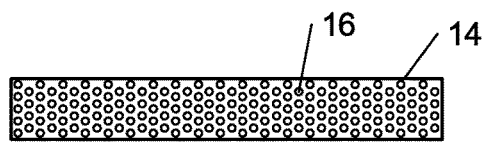
FIG. 5 shows an embodiment of a V-shaped partition according to the invention.

FIG. 4 shows the rear cooling element 10b which is provided over its entire surface, with inverted V-shaped partitions 14 which define mutually interconnected interstices 15, and which are provided with through small openings 16 on the one hand, to prevent the ascension of the ice and on the other hand to allow the avoidance of gas from an interstice to a higher interstice. A surface of such a V-shaped partition is shown in FIG. 5. At both ends of the inverted V-shaped partitions, free passage 17 is provided for the pressure-free and leveling filling of the refrigeration container.

Prior to use, the refrigeration container is filled with binary ice by means of the bottom filling opening of a filling station. For operation with the fresh produce, typically a binary ice slurry comprising 50% of an ice fraction and 7.1% polyethylene glycol is used. With this slurry, an ice temperature of about −2° C. may be attained. For use with the frozen products, typically a binary ice slurry comprising 25% of an ice fraction and 38.6% potassium formate (KCOOH) is used. With this slurry, an ice temperature of about −33° C. may be reached.

It may also be useful to increase the ice fraction in the cooling element whereby the ice temperature remains the same, for example, in order to obtain an extended autonomy of the refrigeration container. Because binary ice with a larger ice fraction is difficult to be pumped, a different approach may be followed in order to bring greater amount of ice in the cooling element. Hereby, the cooling element is first filled with a binary ice slurry with a certain fraction of ice. Then one waits until the (solid) ice and the (liquid) water/polyethylene glycol mixture are fractionated. Then, a portion of this (liquid) water/polyethylene glycol mixture is discharged through the bottom filling opening and replaced by a quantity of binary ice. This process can be repeated two or more times until the desired amount of ice is introduced in the cooling element. According to a particular embodiment, the lower (horizontal) cooling section 10c is also provided with perforations in the bottom of it, for example in a part of the bottom, in which the perforations, for example are in liquid contact with a container, for example, a flat tank, placed under the bottom of the lower cooling segment and equipped for collecting a liquid, particularly the liquid fraction, and provided at the front with an opening for the discharge of the liquid, particularly the liquid fraction. In this way the liquid fraction, comprising the melting ice, may be removed and replaced by a quantity of binary ice slurry, so as to increase the ice fraction in the binary ice.

The invention claimed is:

1. A modular passive refrigeration container comprising at least:
   (i) a cooling element, suitable for binary ice as coolant, comprising at least one plate-shaped hollow cooling segment, wherein the plate-shaped cooling segment defines at least a portion of a refrigeration space,
   (ii) any insulating material in plate shape, and
   (iii) a housing, suitable to receive, said cooling element and said insulating material in plate shape,
   wherein said cooling element is removably surrounded by said housing, and wherein a space between said cooling element and said housing is at least partially filled with said insulating material, the insulating material being reversibly connected with either said housing, or said cooling element, or both, wherein the cooling element comprises at least one connector for providing binary ice in the hollow cooling segment,
   wherein the cooling element has at least two connectors,
   wherein a first connector is situated near the bottom of the cooling element, and a second connector is located near the top of the cooling element,
   wherein the cooling element comprising the second connector is provided with an air-permeable and liquid-permeable, but ice-withholding compartment, forming a partition between the second connector and the rest of the cooling segment, wherein said compartment is a perforated fin, and
   wherein the first connector is an inlet of the cooling element and the second connector is an outlet of the cooling element.

2. The refrigeration container according to claim 1, wherein the cooling element comprises at least two plate-shaped hollow cooling segments, wherein the plate-shaped cooling segments define at least a part of the refrigeration space.

3. The refrigeration container according to claim 2, wherein the at least two plate-shaped hollow cooling segments are connected to each other so that substantially a single hollow, double-walled space is formed.

4. The refrigeration container according to claim 2, wherein three plate-shaped hollow cooling segments form a C-shaped cooling element, in which two plate-shaped cooling segments are arranged parallel to each other and connected by a third which extends perpendicularly between the parallel to each other arranged plate-shaped cooling segments.

5. The refrigeration container according to claim 4, wherein the third plate-shaped cooling segment which extends perpendicularly between the parallel to each other arranged plate-shaped cooling segments is divided into two separate hollow spaces which are not in fluid communication with each other.

6. The refrigeration container according to claim 1, wherein the cooling element comprises at least one further plate-shaped cooling segment, that is connected to one or more edges with the at least three hollow plate-shaped cooling segments.

7. The refrigeration container according to claim 6, wherein the further plate-shaped cooling segment is a hollow plate-shaped cooling segment connected to one or more edges with the other present hollow plate-shaped cooling segments in order to form together one hollow space.

8. The refrigeration container according to claim 6, wherein the further plate-shaped cooling segment is a full plate-shaped cooling segment connected to one or more edges, or is in thermal contact, with the other existing plate-shaped cooling segments.

9. The refrigeration container according to claim 1, comprising a C-shaped cooling element and three full plate-shaped cooling segments, wherein one plate-shaped segment only partially closes the refrigeration space, whereby an opening is left for the passage into the refrigerated container.

10. The refrigeration container according to claim 1, wherein the cooling element is at least partially filled with binary ice.

11. The refrigeration container according to claim 1, wherein at least one plate-shaped cooling segment of the cooling element comprises a structure in the hollow space of the plate-shaped cooling segment comprising essentially of one or more inverted V-shaped partitions which define interconnected interstices, and which are provided with at least one through opening on the one hand to prevent the ascension of the ice and on the other hand to allow the avoidance of gas from an interstice, bounded by two inverted V-shaped partitions, to a higher located interstice.

12. The refrigeration container according to claim 11, wherein a free passage is provided on both sides of the inverted V-shaped partitions.

13. The refrigeration container according to claim 1, wherein the plate-shaped insulation material comprises a vacuum insulation panel (VIP) and/or an aerogel insulation plate.

14. The refrigeration container according to claim 1, wherein the housing is formed by six plate-shaped parts which together define the space which encloses the cooling element and the insulation, preferably an essentially rectangular space.

15. The refrigeration container according to claim 1, wherein the housing is provided with at least one opening in the housing which may be reversibly closed, preferably with a plate-shaped cooling segment.

16. The refrigeration container according to claim 1, wherein the lower cooling segment is provided with perforations in the bottom of it, wherein the perforations are in liquid contact with a container placed under the bottom of the lower cooling segment, equipped for the accommodation of a liquid and on the front side provided with an opening for discharging the liquid.

17. Use of the refrigeration container according to claim 1 for the storage and refrigerated transportation of goods, especially fresh produce and deep-frozen goods, where the goods are stored in the refrigerated container.

18. A method of assembling of a refrigeration container according to claim 1, comprising the steps of:
  (i) providing a cooling element;
  (ii) placement of the cooling element in a box-shaped housing which comprises at least 4 sides, until the cooling element is completely enclosed by the box-shaped housing, wherein a space between said cooling element and said housing is at least partially filled with said insulation material and
  (iii) further sealing of the box-shaped housing with further housing parts.

19. The method according to claim 18, wherein the cooling element is covered with insulating material in plate form and the cooling element, covered with insulating material in plate form is placed in the box-shaped housing until the cooling element, covered with insulating material in plate form is totally enclosed by the box-shaped housing.

20. The method according to claim 18, wherein the box-shaped housing is covered on the inside with insulating material in plate form and the cooling element is placed in the box-shaped body covered with insulating material in plate form until the cooling element is completely enclosed by the housing with insulating material in plate form.

21. The method according to claim 18, wherein the further sealing of the housing with further housing parts comprises the application of a back and/or the application of a front which is provided with at least one opening which may be reversibly closed, preferably with a plate-shaped cooling segment.

* * * * *